June 10, 1930.  P. W. LEHMAN  1,762,824
TIRE BUILDING MACHINE
Filed March 1, 1928  3 Sheets-Sheet 3
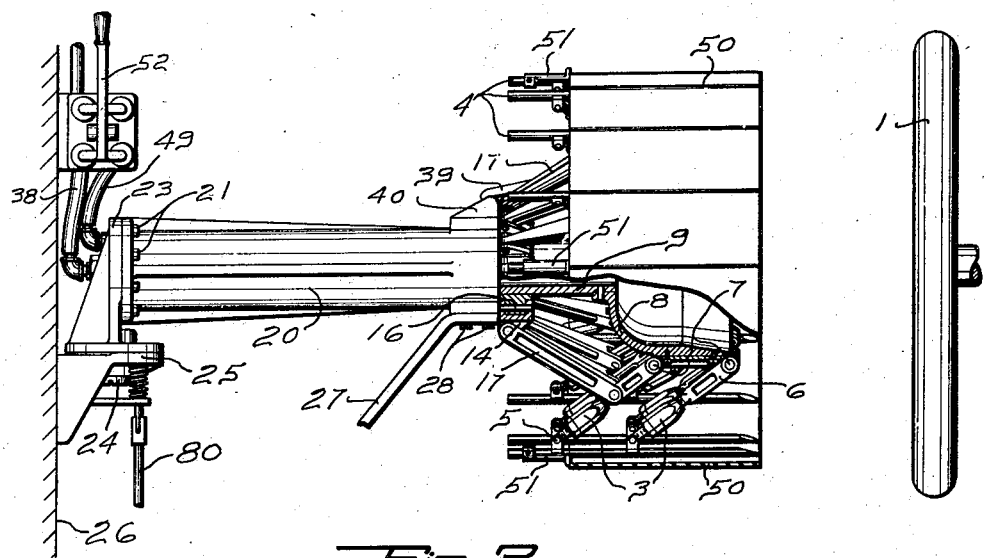
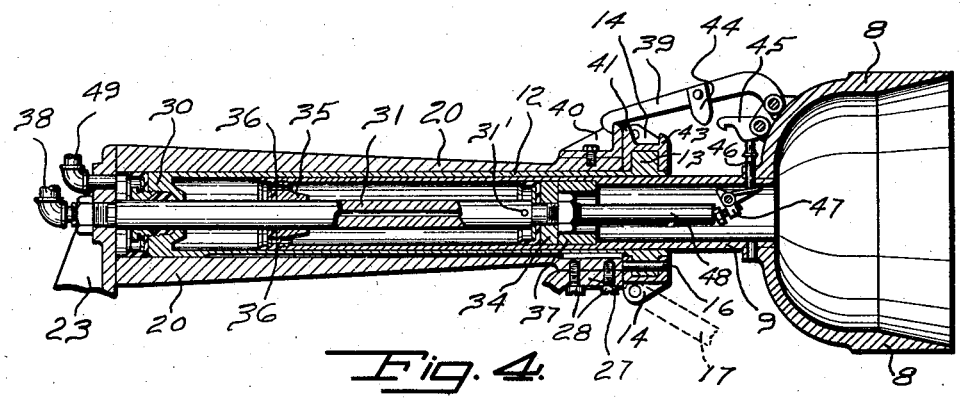
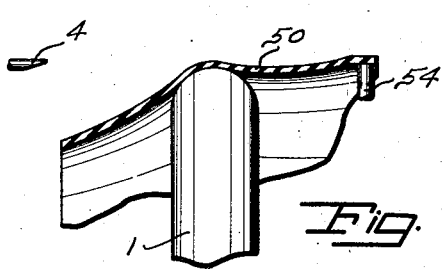
INVENTOR.
PAUL W. LEHMAN.
BY
ATTORNEY.

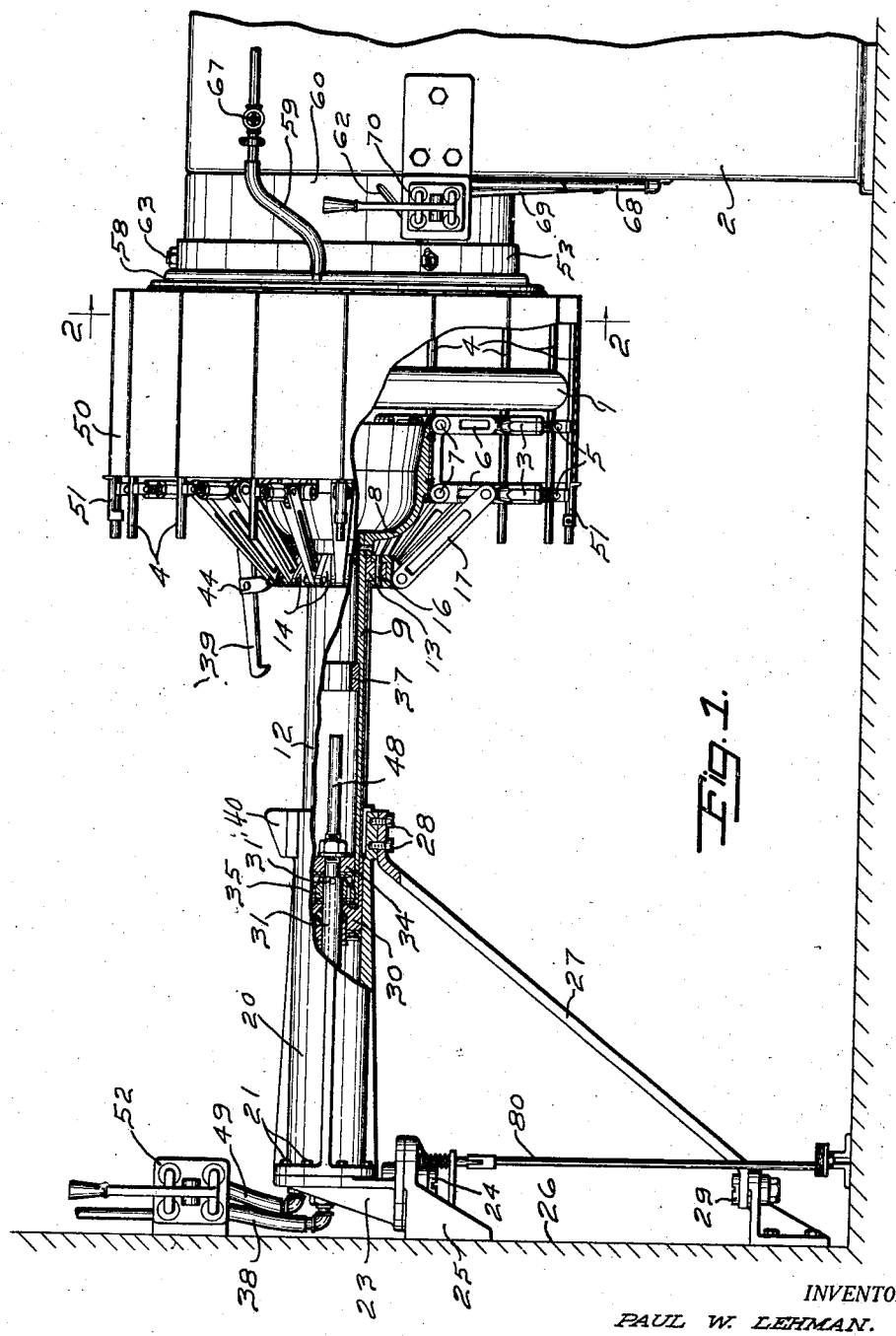

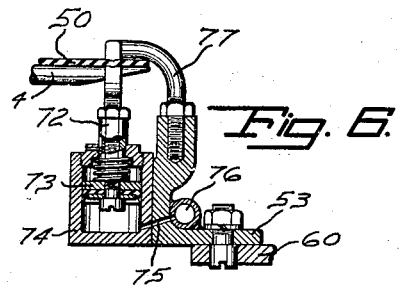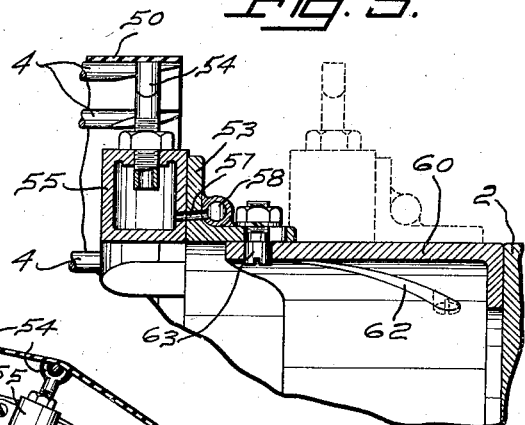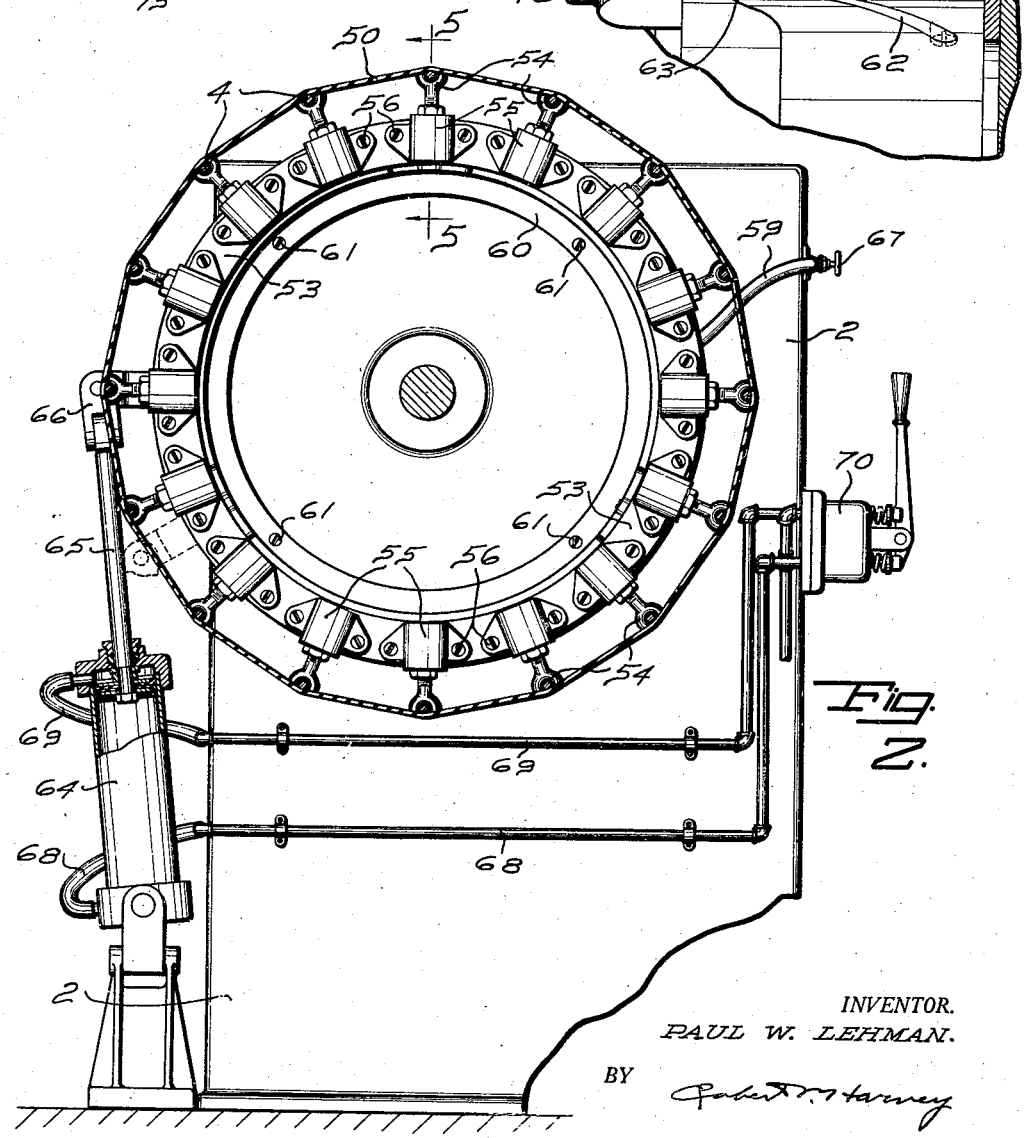

Patented June 10, 1930

1,762,824

UNITED STATES PATENT OFFICE

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE-BUILDING MACHINE

Application filed March 1, 1928. Serial No. 258,203.

This device relates to the manufacture of pneumatic tire casings and more particularly to means for applying annular bands of carcass material to the building core. It has for an object the provision of means for substantially uniformly expanding a band of carcass material and accurately positioning it in stretched condition upon the core substantially automatically. It has for a further object the provision of a device of this character which shall be simple in structure and operation and which may be associated with standard tire building machines without involving any substantial change in the mode of operation of the latter. Other and further objects will be apparent from the following specification and claims. In the accompanying drawings which illustrate one embodiment of my invention, Fig. 1 is a front elevation showing the device in expanded position with a band centered on the core, parts being broken away to better show the construction;

Fig. 2 is a section on line 2—2 of Fig. 1;

Fig. 3 is a view similar to that of Fig. 1 but showing the device in retracted position;

Fig. 4 is a detail view on a larger scale showing the operating mechanism for the expanding fingers;

Fig. 5 is a section on line 5—5 of Fig. 2, showing the suction gripping device for retaining the band upon the core as the fingers are withdrawn;

Fig. 6 shows an alternative form of gripping mechanism; and

Fig. 7 is a detail view, partly in section, showing the action of the grippers as the fingers are withdrawn.

Referring to the drawings, 1 designates a rotatable building core driven by any suitable means enclosed in the housing 2 of a building machine. The band stretching and applying mechanisms comprise a plurality of fingers 4 pivoted at 5 to pairs of parallel links 6, the latter being adjustable in length by means of turn buckles 3. The links 6 are pivoted at 7 to a bell-shaped support 8, the latter being secured to the end of a cylinder 9 which is slidably mounted in a second cylinder 12. As best shown in Fig. 4 the cylinder 12 is provided on its outer edge with a flange 13 carrying a series of lugs 14 secured to the flange by pins 16. Lugs 14 are connected by links 17 to one of each pair of parallel links 6 to operate the latter as later described. Cylinder 12 is slidably mounted in a supporting and operating cylinder 20 which is secured by bolts 21 (see Figs. 1 and 3) to a support 23 pivoted at 24 to a bracket 25 secured to a wall or suitable upright 26. Cylinder 20 is further supported by a brace 27 secured to the outer end of cylinder 20 by machine screws 28, the lower end of the brace being pivotally mounted at 29 to a bracket secured to wall or upright 26. Referring to Fig. 4 again, cylinder 12 is provided with a head 30 slidably mounted on a hollow rod 31, the latter having a stationary head 34 secured to its outer end. Cylinder 9 is provided with a head 35 also slidably mounted on rod 31 and provided with airports 36. Cylinder 9 is provided intermediate its ends with a stop ring 37. Bell 8 carries a pivot latch 39 adapted, when the parts are in the position shown in Fig. 4, to engage a lug 40 formed on cylinder 20. One of the lugs 14 carried by cylinder 12 is provided with a projection 41 adapted, upon the advance of cylinder 12 as later described, to engage a projection 44 secured to latch 39 to release the latch from engagement with the lug 40. A second projection 43 is associated with projection 41 and is adapted to be re-engaged by a second latch 45 pivotally mounted on bell 8. Latch 45 is normally held in raised position by a pin 46, actuated by a bell crank trip lever 47 pivoted within the cylinder 9 and positioned to be engaged by extension 48 of rod 31 when the parts are in the position shown in Fig. 4.

A band of carcass material 50 having been placed over the fingers 4, as shown in Fig. 3, and against adjustable guides 51 carried by certain of the fingers 4, the mechanism is operated as will now be described to expand the pocket and position it over the core. Through suitable air connections 49 and 38 and valve 52, compressed air is respectively admitted behind cylinder head 30 and exhausted in front of it to advance cylinder 12 and through links 17 and 6 to move fingers 4 outwardly to expand the band 50 to a diameter slightly greater than that of core 1. As cylinder 12 advances, projection 41 engages lever 44 to release latch 39 and bring projection 43 beneath latch 45. As cylinder 12 reaches this position head 30 engages head 35 of cylinder 9, carrying bell 8, and in its continued advance carries cylinder 9 and bell 8 with it, moving trip 47 out of engagement with extension 48, permitting pin 46 to drop and latch 45 to engage projection 43 to lock bell 8 to cylinder 12. Cylinders 12 and 9 thereafter advance as a unit carrying the expanded band 50 over the building core as shown in Fig. 1.

With the band in this position the outer edge of the band is engaged by gripping means which will now be described, reference being had particularly to Figs. 2 and 5. A ring 53 carrying forked suction fingers 54, connected to chambers 55 secured to ring 53 by screws 56, is slidably mounted on a flange 60 secured by machine screws 61 to housing 2. Ring 53 carries an annular pipe 58 connected by ducts 57 to each of the chambers 55, suction being supplied to the pipe 58 through air line 59 controlled by a suitable valve 67. Ring 53 is provided with pins 63 operating in inclined cam slots 62 formed in flange 60. Due to the inclination of slots 62 it is evident that a partial rotation of ring 53 will cause the ring and the parts carried thereby to move from the full line position shown in Fig. 5 to the dotted line position of that figure. Such partial rotation of ring 53 is effected by an air cylinder 64 the piston rod 65 of which is connected by link 66 to the ring 53, cylinder 64 being operated from air connections 68 and 69 controlled by a suitable valve 70. When the expanded band 50 has been moved into position over the core, as previously described and shown in Figs. 1 and 2, cylinder 64 is operated to move the ring 53 and suction fingers 54 from the dotted line position of Fig. 5 to the full line position of that figure. Suction is then applied to the fingers 54 by valve 67 causing the fingers 54 to grip the band 50 at each side of the fingers 4, as best shown in Fig. 2. Mechanical gripping means may be substituted for the suction fingers 54 such as is shown in Fig. 6 where suction fingers 54 have been replaced by fingers 72 secured to a cylinder head 73 operating in cylinders 74 which may be in all respects similar to cylinders 55 but adapted to receive compressed air from the ring 76 to which the cylinder is connected by duct 75. Admission of compressed air to cylinder 74 causes finger 72 to move outwardly to engage the underside of band 50 and force it against fixed abutments 77 carried by the ring 53 to grip the band of carcass material. Whatever type of gripper is used it will be evident that upon the retraction of the fingers 4 the band of carcass material 50 will be left in predetermined position on the core (see Fig. 7).

The withdrawal of fingers 4 and their retraction is accomplished as follows, see Figs. 1, 3 and 4. Through valve 52 and pipe 49 air is exhausted behind cylinder head 30 and admitted, through hollow rod 31, port 31' and ports 36, in front of head 30 to retract cylinder 9 and the bell 8 and parts carried thereby. Due to the fact that latch 45 is in engagement with projection 43 cylinders 9 and 12 move back as a unit until trip lever 47 engages projection 48 to raise latch 45 and free cylinder 12; at the same time stop ring 37 engages head 34 of rod 31. The movement of cylinder 9 is thus halted while cylinder 12 is further retracted, link 17 now operating to swing links 6 about their pivot to collapse the fingers 4. As cylinder 12 reaches its inward limit of motion latch 39 rides into engagement with lug 40 locking the parts in their position shown in Fig. 4. Cylinder 20 which has been held in alignment with the core by means of spring latch 80 may upon release of the latter be swung about its pivot 24 to permit access to the core 1 for further building operations.

As will be obvious turn buckles 3 may be adjusted to accommodate various diameters of cores and the adjustment of guides 51 controls the positioning of the band with relation to the core.

Having thus described my invention, I claim:

1. A device of the character described comprising a plurality of substantially parallel band supporting fingers arranged in an annular formation and means to move said fingers radially and in parallel relation to increase the diameter of the annular formation.

2. A device of the character described comprising a plurality of substantially parallel band supporting fingers arranged in an annular formation, means to vary the normal diameter of the annular formation and means to expand said fingers radially and in parallel relation to increase the diameter of the annular formation.

3. A device of the character described comprising a support, a plurality of band supporting fingers arranged around the support in an annular formation, each finger being pivotally connected to said support by a pair of parallel links and means to swing said links about their pivots to expand and contract the annular formation of the fingers.

4. A device of the character described comprising a support, a plurality of band supporting fingers arranged around the support in an annular formation, each finger being pivotally connected to said support by a pair of parallel links, means to individually adjust the length of said links and means to simultaneously swing said links about their pivots to expand and contract the annular formation of the fingers.

5. A device of the character described comprising a plurality of fingers adapted to support a band of carcass material and arranged in an annular formation, means to expand said supports radially and in parallel relation to increase the diameter of the annular formation and stretch the band of carcass material supported thereon, means to telescope the expanded supports and band over a tire building core and means to retain the band in predetermined position on the core upon withdrawal of the supports.

6. A device of the character described comprising a support adapted to be moved into and out of alignment with the axis of a tire building core, a plurality of band supporting fingers arranged around the support in an annular formation, each finger being pivotally connected to the support by a pair of parallel links, means to swing said links about their pivots to expand said fingers so as to increase the diameter of the annular formation and stretch the band supported thereon, means to telescope the expanded fingers and band over a tire building core and means positioned on the opposite side of the building core to grip the outer edge of the band and retain it in predetermined position on the core upon withdrawal of the fingers.

7. A device for stretching a band of carcass material and positioning it on a tire building core comprising a plurality of band supporting members normally positioned to form an annulus of less diameter than the crown diameter of the core, means to move the supporting members in parallel relation to increase the diameter of the annulus to greater than core diameter and to stretch the band of carcass material positioned thereon, means to telescope the so supported and expanded band over the core and means to retain the band upon the core upon withdrawal of the supports.

PAUL W. LEHMAN.